(12) United States Patent
Kim et al.

(10) Patent No.: US 11,494,598 B2
(45) Date of Patent: Nov. 8, 2022

(54) AUTOMOTIVE SENSOR INTEGRATION MODULE

(71) Applicant: HYUNDAI MOBIS CO., LTD., Seoul (KR)

(72) Inventors: Young Shin Kim, Yongin-si (KR); Kyung Rin Kim, Yongin-si (KR); Sung Eun Jo, Yongin-si (KR); Won Gyum Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 454 days.

(21) Appl. No.: 16/726,739

(22) Filed: Dec. 24, 2019

(65) Prior Publication Data
US 2021/0125010 A1 Apr. 29, 2021

(30) Foreign Application Priority Data
Oct. 24, 2019 (KR) .......................... 10-2019-0133130

(51) Int. Cl.
| | |
|---|---|
| *H04Q 9/04* | (2006.01) |
| *G06K 9/62* | (2022.01) |
| *H04L 67/12* | (2022.01) |
| *G01S 13/86* | (2006.01) |
| *G01S 13/931* | (2020.01) |
| *G01S 7/40* | (2006.01) |
| *H04N 17/00* | (2006.01) |
| *G06V 10/56* | (2022.01) |
| *G06V 10/98* | (2022.01) |
| *G06V 20/56* | (2022.01) |

(52) U.S. Cl.
CPC .............. *G06K 9/6288* (2013.01); *G01S 7/40* (2013.01); *G01S 13/865* (2013.01); *G01S 13/867* (2013.01); *G01S 13/931* (2013.01); *G06V 10/56* (2022.01); *G06V 10/98* (2022.01); *G06V 20/588* (2022.01); *H04L 67/12* (2013.01); *H04N 17/002* (2013.01); *H04Q 9/04* (2013.01); *H04Q 2209/845* (2013.01)

(58) Field of Classification Search
CPC ...... H04L 67/12; G06K 9/6288; B60K 35/00; G01S 13/865; G01S 13/867; H04N 5/23238; G06T 15/06; G06T 17/20
USPC ........................................... 342/53; 382/104
See application file for complete search history.

(56) References Cited

U.S. PATENT DOCUMENTS

2017/0195564 A1* 7/2017 Appia ....................... B60R 1/00

* cited by examiner

*Primary Examiner* — Phuoc H Doan
(74) *Attorney, Agent, or Firm* — H.C. Park & Associates, PLC

(57) ABSTRACT

An automotive sensor integration module including a plurality of sensors which differ in at least one of a sensing period or an output data format, and a signal processor, which simultaneously outputs, as sensing data, pieces of detection data respectively output from the plurality of sensors on the basis of the sensing period of any one of the plurality of sensors, calculates a reliability value of each of the pieces of detection data on the basis of the pieces of detection data and external environment data, and outputs the reliability value as reliability data.

19 Claims, 7 Drawing Sheets

AUTOMOTIVE SENSOR INTEGRATION MODULE

CROSS-REFERENCE TO RELATED APPLICATION

This application claims priority from and the benefit of Korean Patent Application No. 10-2019-0133130, filed on Oct. 24, 2019, which is hereby incorporated by reference for all purposes as if set forth herein.

BACKGROUND

Field

Exemplary embodiments relate to an automotive sensor integration module.

Discussion of the Background

As technology becomes more advanced, various sensors, electronic devices, and the like are also provided in a vehicle for user convenience. In particular, research regarding an advanced driver assistance system (ADAS) has been actively conducted for users' driving convenience. Furthermore, the development of autonomous vehicles is actively under way.

The ADAS and the autonomous vehicles require a large number of sensors and electronic devices to identify objects outside a vehicle.

Referring to FIG. 1, in order to detect objects in front of a vehicle, a camera, a lidar, a radar sensor, etc. are disposed in front of the vehicle, but are disposed at different positions, respectively.

Although objects should be identified on the basis of detection results detected by sensors at the same timing in order to improve performance in detecting objects, it is not easy to synchronize object detection sensors because the sensors are disposed at different positions. Furthermore, when there is dirt or other foreign matter is disposed on outer cover surfaces of the sensors, it may become difficult for each of the sensors to output a detection result for normal object discrimination.

The above information disclosed in this Background section is only for enhancement of understanding of the background of the invention and, therefore, it may contain information that does not constitute prior art.

SUMMARY

Exemplary embodiments of the present invention provide an automotive sensor integration module.

Exemplary embodiments of the present invention also provide an automotive sensor integration module in which a plurality of synchronized sensors are arranged.

Additional features of the invention will be set forth in the description which follows, and in part will be apparent from the description, or may be learned by practice of the invention.

An exemplary embodiment of the present invention provides an automotive sensor integration module including a plurality of sensors which differ in at least one of a sensing period or an output data format, and a signal processing unit, which simultaneously outputs, as sensing data, pieces of detection data respectively output from the plurality of sensors on the basis of the sensing period of any one of the plurality of sensors; calculates a reliability value of each of the pieces of detection data on the basis of the pieces of detection data and external environment data; and outputs the reliability value as reliability data.

Another exemplary embodiment of the present invention provides an automotive sensor integration module including a plurality of sensors which differ in at least one of a sensing period or an output data format, an output synchronization unit, which simultaneously outputs, as sensing data, pieces of detection data respectively output from the plurality of sensors on the basis of the sensing period of any one of the plurality of sensors, and a data reliability determination unit, which calculates a reliability value of each of the pieces of detection data on the basis of the pieces of detection data and external environment data, and outputs the reliability value as reliability data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the is principles of the invention.

DETAILED DESCRIPTION OF THE ILLUSTRATED EMBODIMENTS

Figure 1:
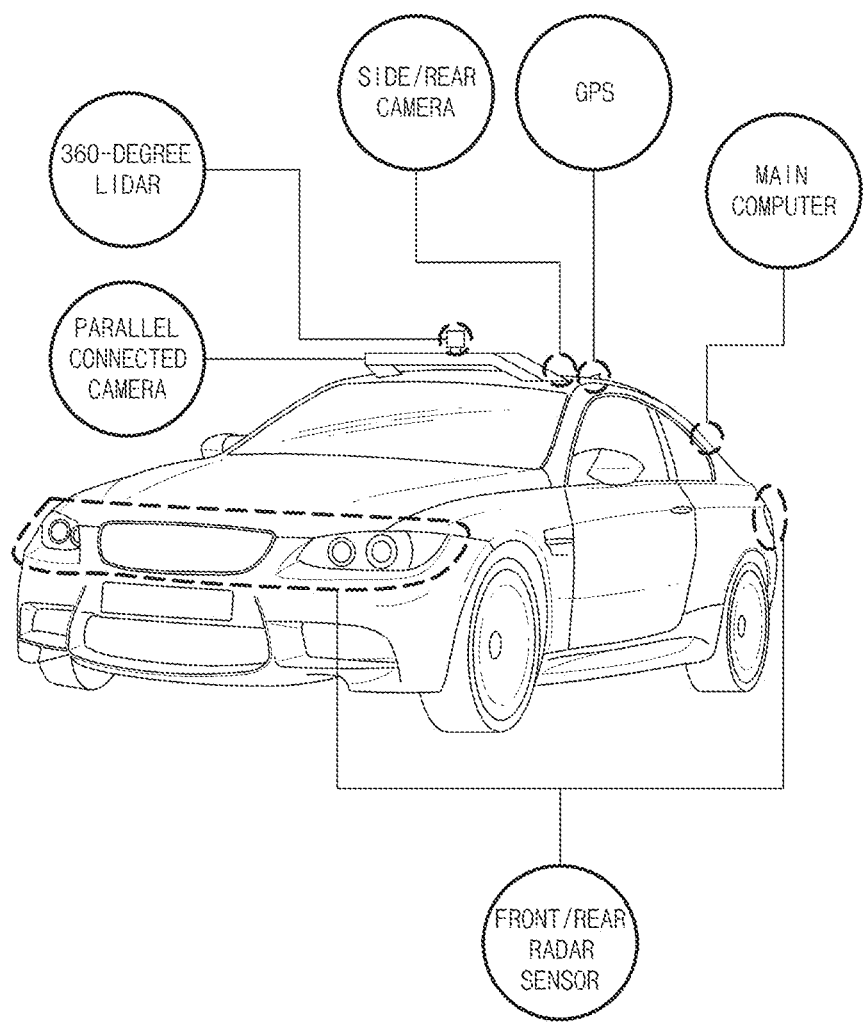
FIG. 1 is a diagram illustrating an outer shape of an autonomous vehicle.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore is the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

When a certain element is referred to as being "on (or under)" another element, the certain element may be disposed in contact with the upper surface (or lower surface) of the other element or an intervening element may be present between the other element and the certain element disposed on (or under) the other element.

Furthermore, it will be understood that when a certain element is referred to as being "connected to" or "coupled to" another element, these elements may be directly connected or coupled to each other, but an intervening element may be "interposed" therebetween, or the elements may be connected or coupled to each other via another element.

As is customary in the field, some exemplary embodiments are described and illustrated in the accompanying drawings in terms of functional blocks, units, and/or modules. Those skilled in the art will appreciate that these blocks, units, and/or modules are is physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 2:
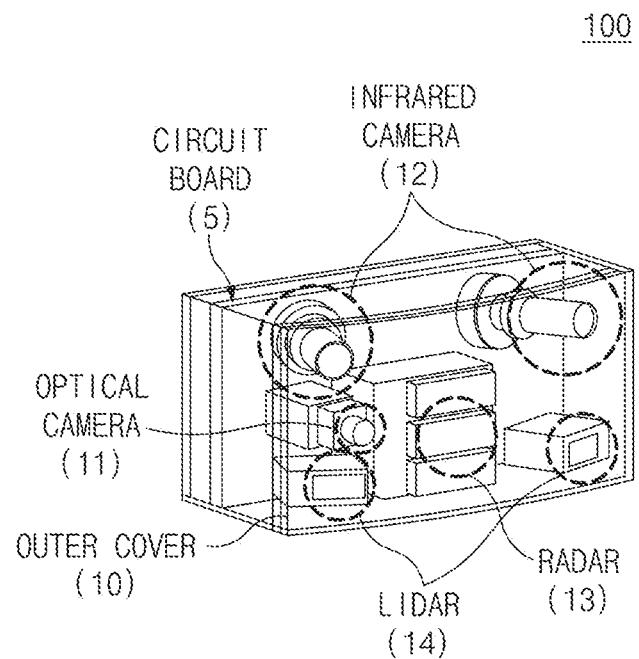
FIG. 2 is an outside view of an automotive sensor integration module according to an exemplary embodiment of the present invention.

FIG. 2 is an outside view of an automotive sensor integration module according to an exemplary embodiment of the present invention.

An automotive sensor integration module according to an exemplary embodiment of the present invention may include a plurality of devices and sensors for detecting objects outside a vehicle to acquire safety information related to vehicle driving. In this case, the objects may include a lane, another vehicle, a pedestrian, a two-wheeled vehicle, a traffic signal, light, a road, a structure, a speed bump, a geographical feature, an animal, etc.

The lane may be a driving lane, a lane next to the driving lane, or a lane along is which an opposite vehicle travels. The lane may include left and right lines forming a lane.

Another vehicle may be a vehicle that is travelling in the vicinity of a host vehicle. The other vehicle may be a vehicle within a predetermined distance from the host vehicle. For example, the other vehicle may be a vehicle that is located within a predetermined distance from the host vehicle and precedes or follows the host vehicle.

The pedestrian may be a person in the vicinity of a host vehicle. The pedestrian may be a person located within a predetermined distance from the host vehicle. For example, the pedestrian may be a person on a sidewalk or the roadway within a predetermined distance from the host vehicle.

The two-wheeled vehicle may be a vehicle that is located in the vicinity of a host vehicle and moves using two wheels. The two-wheeled vehicle may be a vehicle that has two wheels and is located within a predetermined distance from the host vehicle. For example, the two-wheeled vehicle may include a motorcycle or a bicycle on a sidewalk or the roadway within a predetermined distance from the vehicle.

The traffic signal may include a traffic light, a traffic sign, a pattern, or text drawn on a road surface.

The light may include light from a lamp in another vehicle, light from a street lamp, or light emitted from the sun.

The road may include a road surface, a curve, and a slope such as an upward slope and a downward slope.

The structure may be an object which is located around the road and fixed onto the ground. For example, the structure may include a streetlight, a roadside tree, a building, a power pole, a traffic light, a bridge, etc.

The geographical feature may include a mountain, a hill, etc.

Meanwhile, the objects may be classified as a moving object or a stationary object. For example, the moving object may conceptually include another vehicle, a two-wheeled vehicle, a pedestrian, etc., while the stationary object may conceptually include a traffic signal, a road, a structure, etc.

As such, it may be desirable to use various sensors and devices to accurately identify various objects around a vehicle.

In order to accurately identify objects outside a vehicle, an automotive sensor integration module according to an exemplary embodiment of the present invention may include a plurality of different types of sensors and devices. In addition, the automotive sensor integration module according to an exemplary embodiment of the present invention may include at least one sensor and device of the same type.

Referring to FIGS. 2-5, the automotive sensor integration module 100 according to an exemplary embodiment of the present invention may include an infrared camera 12, an optical camera 11, a lidar 14, and a radar 13 as a sensor to identify an object outside a vehicle. The automotive sensor integration module 100 according to an exemplary embodiment of the present invention illustrated in FIG. 2 is exemplarily shown to include an infrared camera 12, an optical camera 11, a lidar 14, and a radar 13 as a sensor in order to identify an object, but the inventive concepts are not limited thereto. In addition, the automotive sensor integration module 100 according to an exemplary embodiment of the present invention illustrated in FIG. 2 shows two infrared cameras 12, one optical camera, two lidars 14, and one radar 13, but the number of each sensor is suggested only for illustrative purposes and is not limited thereto.

Referring to FIGS. 2-5, the automotive sensor integration module 100 according to an exemplary embodiment of the present invention may include a circuit board, an infrared camera 12, an optical camera 11, a radar 13, and a lidar 14. For example, the automotive sensor integration module 100 according to an exemplary embodiment of the present invention may include a circuit board on which an infrared camera 12, an optical camera 11, a radar 13, and a lidar 14 are disposed and mounted.

The optical camera 11 designed to acquire outside images of a vehicle through light and recognize objects, light, and people around the vehicle may include a mono camera, a stereo camera, an around view monitoring (AVM) camera, and a 360-degree camera. The optical camera 11 has advantages of being able to detect colors and accurately classify objects compared to other sensors, but has a disadvantage of being affected by environmental factors, such as darkness, backlight, snow, rain, fog, etc.

The radar 13 may detect an object on the basis of a time-of-flight (TOF) method or a phase-shift method through electromagnetic waves, and detect the location of a detected object, the distance to the detected object, and the relative speed. The radar 13 has an advantage of being capable of long distance detection without being affected by environmental factors such as darkness, snow, rain, fog, etc., but has a disadvantage of failing to detect an object, made of an electromagnetic wave-absorbing material, for example, a steel structure such as a tunnel or a guardrail, and thus, being unable to classify objects.

The lidar 14 may detect an object on the basis of a TOF method or a phase-shift method through laser light, and detect the location of a detected object, the distance to the detected object, and the relative speed. The lidar 14 has advantages of being less affected by environmental factors such as darkness, snow, rain, fog, etc., efficient in long- and short-distance detection due to high resolution, and objects are able to be simply classified, but has a disadvantage of failing to measure the speed of objects immediately.

The infrared camera 12 may acquire outside images of a vehicle through infrared rays. In particular, the infrared camera 12 may acquire outside images of the vehicle even in darkness at night. The infrared camera 12 has advantages of being capable of long distance detection and being able to distinguish living things from objects without being affected by environmental factors such as darkness, snow, rain, fog, etc. but has a disadvantage of being expensive.

The automotive sensor integration module 100 according to an exemplary embodiment of the present invention is configured such that an outer cover is coupled in the direction of the detection area of an optical camera 11, an infrared camera 12, a radar 13, and a lidar 14, that is, to the front surface of the automotive sensor integration module 100 to thereby protect the optical camera 11, the infrared camera 12, the radar 13, and the lidar 14 from physical shocks.

As such, in order to accurately classify and identify external objects around a vehicle regardless of environmental factors, the advantages and disadvantages of each sensor must be combined. Therefore, the automotive sensor integration module 100 according to an exemplary embodiment of the present invention discloses a structure in which a plurality of different sensors are all disposed and mounted on a circuit board. In addition, the automotive sensor integration module 100 according to an exemplary embodiment of the present invention may synchronize and output detection results of a plurality of sensors having different operation cycles, thereby having an advantage of classifying and identifying objects more accurately.

Figure 3:
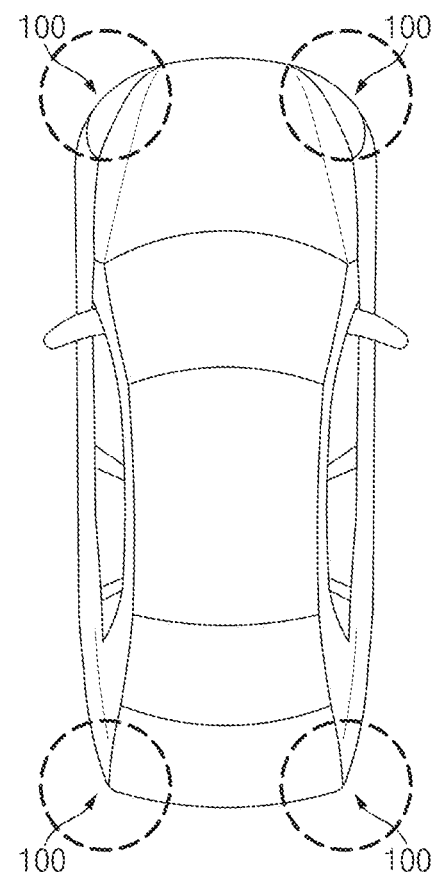
FIG. 3 is a diagram illustrating a vehicle in which automotive sensor integration modules according to an exemplary embodiment of the present invention are arranged.

FIG. 3 is a diagram illustrating a vehicle in which automotive sensor integration modules according to an exemplary embodiment of the present invention are arranged.

Referring to FIG. 3, a plurality of automotive sensor integration modules 100 according to an exemplary embodiment of the present invention may be arranged in a vehicle to detect objects outside the vehicle.

FIG. 3 exemplarily illustrates that four automotive sensor integration modules 100 are arranged in a vehicle, but is the inventive concepts are not limited thereto. Furthermore, FIG. 3 exemplarily illustrates that automotive sensor integration modules 100 are arranged at right and left front sides of a vehicle to detect right and left objects in front of the vehicle, and automotive sensor integration modules 100 are arranged at right and left rear sides of the vehicle to detect right and left objects in back of the vehicle.

Figure 4:
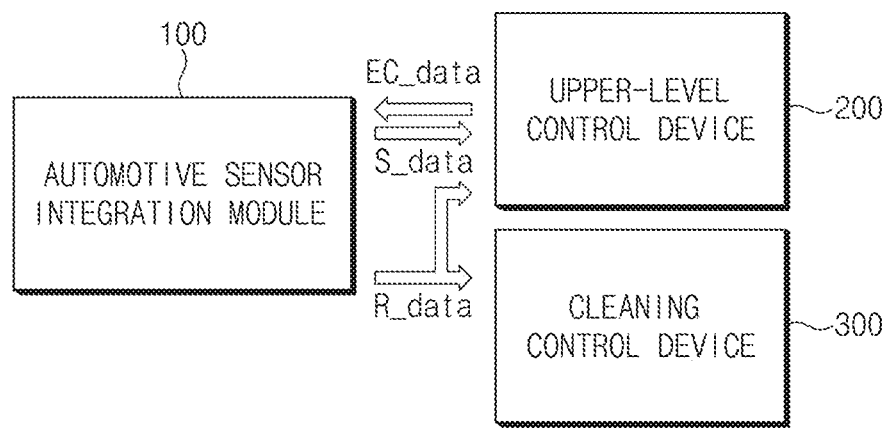
FIG. 4 is a diagram illustrating a configuration of a vehicle in which an automotive sensor integration module according to an exemplary embodiment of the present invention is arranged.

FIG. 4 is a diagram illustrating a configuration of a vehicle in which an automotive sensor integration module 100 according to an exemplary embodiment of the present invention is arranged.

The vehicle in which an automotive sensor integration module 100 according to an exemplary embodiment of the present invention is arranged may further include an upper-level control device 200 and a cleaning control device 300.

Referring to FIG. 4, the vehicle may include the automotive sensor integration module 100, the upper-level control device 200, and the cleaning control device 300.

The automotive sensor integration module 100 may synchronize pieces of detection data obtained from each sensor, and may provide synchronized data as sensing data S_data to the upper-level control device 200. The automotive sensor integration module 100 may generate reliability data R_data on the basis of the detection data obtained from each sensor, and may provide the generated reliability data R_data to the upper-level control device 200 and the cleaning control device 300.

The upper-level control device 200 may provide external environment data EC_data to the automotive sensor integration module 100. The external environment data EC_data may include at least one of weather, road condition, temperature, or humidity.

Although the automotive sensor integration module 100 according to an exemplary embodiment of the present invention is described as being provided with the external environment data EC_data from the upper-level control device 200, the automotive sensor integration module 100 may be provided with the external environment data EC_data from a temperature sensor, a humidity sensor, a rain sensor, and a navigation device arranged in a vehicle.

The upper-level control device 200 may be a separate device for controlling the automotive sensor integration module 100, or a device included in an automated driving system or advanced driver assistance system (ADAS) to identify objects or control driving of a vehicle.

The upper-level control device 200 may identify an object on the basis of the sensing data S_data and the reliability data R_data provided from the automotive sensor integration module 100, and may control driving of a vehicle according to an identification result. For example, the upper-level control device 200 may determine the sensing data S_data on the basis of the reliability data R_data, and may identify an object using only the determined sensing data S_data. Therefore, object identification performance of the upper-level control device 200 may be improved.

The cleaning control device 300 may determine whether each of outer cover regions respectively corresponding to locations of the plurality of sensors is contaminated on the basis of the reliability data R_data provided from the automotive sensor integration module 100. For example, when the cleaning control device 300 determines, on the basis of the reliability data R_data, that the sensing data S_data having low reliability is output from the automotive sensor integration module 100, the cleaning control device 300 may determine that dirt or other foreign matter has adhered to an outer cover of the automotive sensor integration module 100.

When it is determined that dirt has adhered to the outer cover of the automotive sensor integration module 100, the cleaning control device 300 may provide a cleaning command to a cleaning device (not shown).

Here, the automotive sensor integration module 100, the upper-level control device 200, and the cleaning control device 300 may be connected by vehicle network communication. A vehicle network communication technology may include controller area network (CAN) communication, local interconnect network (LIN) communication, Flex-Ray® communication, Ethernet, and the like.

Figure 5:
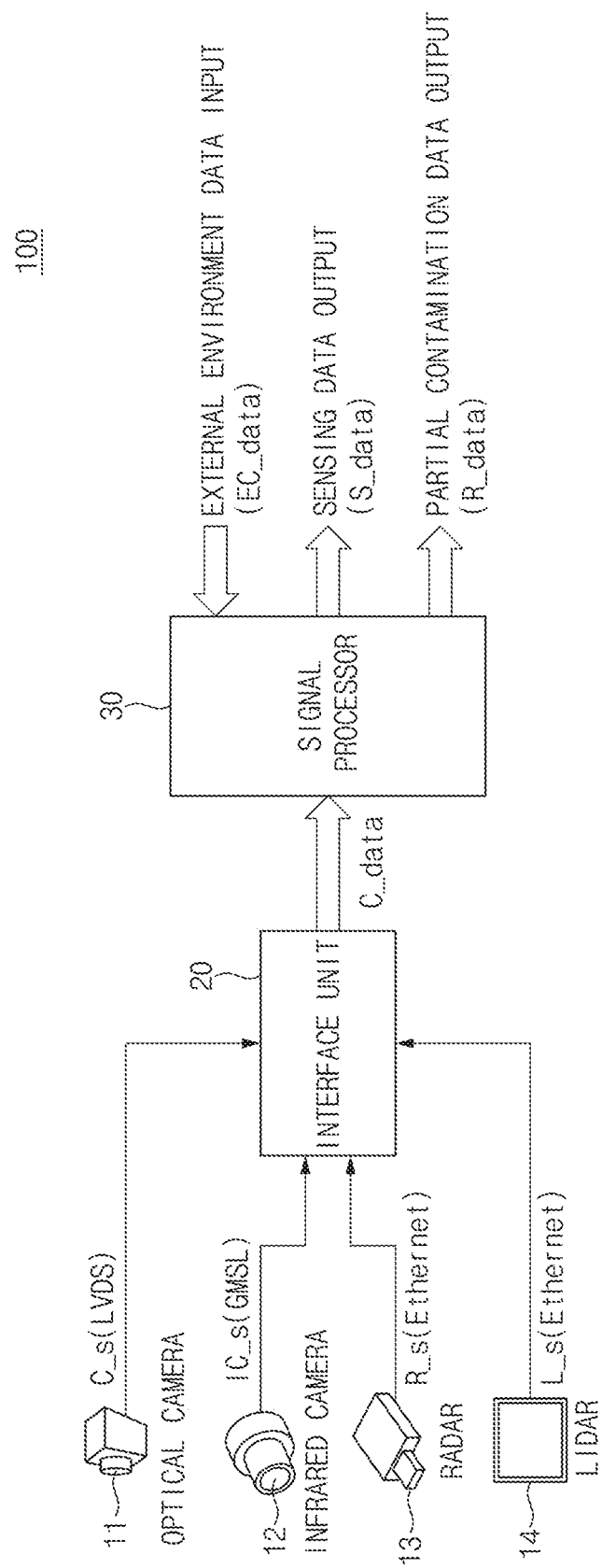
FIG. 5 is a diagram illustrating a configuration of an automotive sensor integration module according to an exemplary embodiment of the present invention.

FIG. 5 is a diagram illustrating a configuration of an automotive sensor integration module according to an exemplary embodiment of the present invention.

Referring to FIG. 5, the automotive sensor integration module 100 according to an exemplary embodiment of the present invention may include an optical camera 11, an infrared camera 12, a radar 13, a lidar 14, an interface unit 20, and a signal processing unit 30. Here, the interface unit 20 and the signal processing unit 30 may be implemented as hardware or software in the circuit board illustrated in FIG. 2.

The optical camera 11 may output information detected by medium of light as first detection data C_s.

The infrared camera 12 may output information detected by medium of infrared light as second detection data IC_s.

The radar 13 may output information detected by medium of electromagnetic is waves as third detection data R_s.

The lidar 14 may output information detected by medium of laser light as fourth detection data L_s.

Here, the optical camera 11, the infrared camera 12, the radar 13, and the lidar 14 may have different sensing (operation) periods. For example, the optical camera 11 and the infrared camera 12 may have a sensing period of 30 Hz, the radar 13 may have a sensing period of 20 Hz, and the lidar 14 may have a sensing period of 10 Hz.

Therefore, the optical camera 11 and the infrared camera 12 may output the first and second detection data C_s and IC_s every first time (33 ms), the radar 13 may output the third detection data R_s every second time (50 ms), and the lidar 14 may output the fourth detection data L_s every third time (100 ms).

Furthermore, the detection data C_s, IC_s, R_s, and L_s respectively output from the optical camera 11, the infrared camera 12, the radar 13, and the lidar 14 may have different communication standards. For example, the first detection data C_s output from the optical camera 11 may have a format used in low voltage differential signal (LVDS) communication. The second detection data IC_s output from the infrared camera 12 may have a format used in gigabit multimedia serial link (GMSL) communication. The third and fourth detection data R_s and L_s output from the radar 13 and the lidar 14 may have a format used in Ethernet communication.

The interface unit 20 may convert the first to fourth detection data C_s, IC_s, R_s, and L_s having different data formats into one preset data format to provide converted data as conversion data C_data to the signal processing unit 30. The interface unit 20 may convert the formats of the first to fourth detection data C_s, IC_s, R_s, and L_s into a data format according is to a preset communication technology among vehicle network communication technologies.

Here, the vehicle network communication technologies may include controller area network (CAN) communication, local interconnect network (LIN) communication, Flex-Ray® communication, Ethernet, and the like. For example, the interface unit 20 may convert the first to fourth detection data C_s, IC_s, R_s, and L_s into data having a format according to Ethernet communication.

The signal processing unit 30 may receive, as the conversion data C_data, the first to fourth detection data C_s, IC_s, R_s, and L_s converted by the interface unit 20 and having the same format. The signal processing unit 30 may output the first to fourth detection data C_s, IC_s, R_s, and L_s included in the conversion data C_data provided from the interface unit 20 to the upper-level control device 200 as sensing data S_data in synchronization with a preset timing.

For example, the signal processing unit 30 may output the first to fourth detection data C_s, IC_s, R_s, and L_s as the sensing data S_data at the same timing on the basis of an input timing of one of the first to fourth detection data C_s, IC_s, R_s, and L_s. In more detail, the signal processing unit 30 may receive and store the first-to-fourth detection data C_s, IC_s, R_s, and L_s, and may output the stored first-to-fourth detection data C_s, IC_s, R_s, and L_s as the sensing data S_data after a preset time has passed after the third detection data R_s was input to the signal processing unit 30.

Here, the sensing data S_data may include the first-to-fourth detection data C_s, IC_s, R_s, and L_s obtained from the optical camera 11, the infrared camera 12, the radar 13, and the lidar 14.

Furthermore, the signal processing unit 30 may generate the reliability data R_data on the basis of the external environment data EC_data and the conversion data C_data, and may provide the generated reliability data R_data to the upper-level control device 200 and the cleaning control device 300.

For example, the signal processing unit 30 may determine, on the basis of the conversion data C_data and the external environment data, the reliability of each of the first to fourth detection data C_s, IC_s, R_s, and L_s output from the optical camera 11, the infrared camera 12, the radar 13, and the lidar 14, and may output a determination result as the reliability data R_data.

Figure 6:
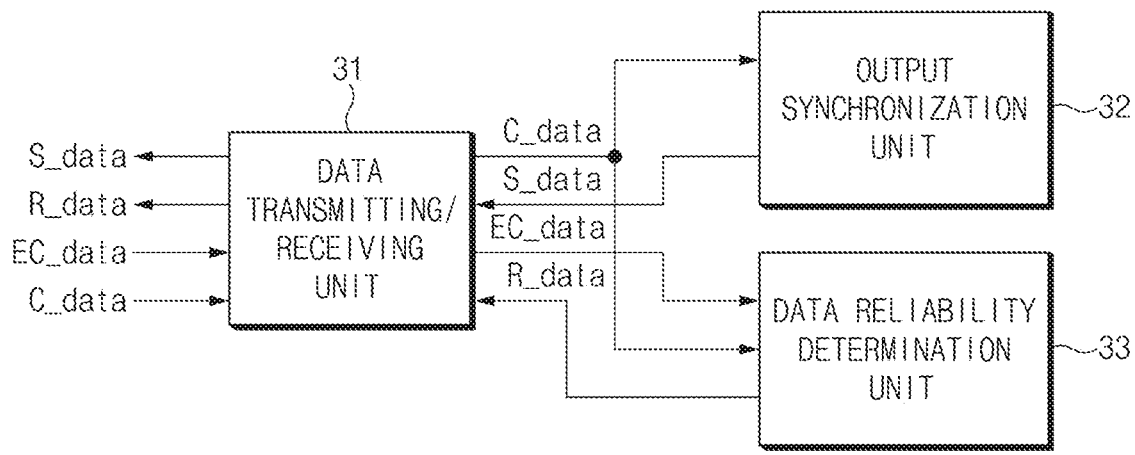
FIG. 6 is a diagram illustrating a configuration of the signal processing unit of FIG. 5.

FIG. 6 is a diagram illustrating a configuration of the signal processing unit of FIG. 5.

Referring to FIG. 6, the signal processing unit 30 may include a data transmitting/receiving unit 31, an output synchronization unit 32, and a data reliability determination unit 33.

The data transmitting/receiving unit 31 may include a wired/wireless communication module for transmitting/receiving data to/from the interface unit 20, the upper-level control device 200, and the cleaning control device 300.

The data transmitting/receiving unit 31 may transmit, to the upper-level control device 200, the sensing data S_data received from the output synchronization unit 32. The data transmitting/receiving unit 31 may transmit, to the upper-level control device 200 and the cleaning control device 300, the reliability data R_data received from the data reliability determination unit 33.

The data transmitting/receiving unit 31 may transmit, to the data reliability determination unit 33, the external environment data EC_data received from the upper-level control device 200. The data transmitting/receiving unit 31 may transmit, to the output synchronization unit 32 and the data reliability determination unit 33, the conversion data C_data received from the interface unit 20.

The output synchronization unit 32 may generate the sensing data S_data by synchronizing the conversion data C_data provided from the data transmitting/receiving unit 31, and may provide the generated sensing data to the data transmitting/receiving unit 31. For example, the output synchronization unit 32 may synchronize the first-to-fourth detection data C_s, IC_s, R_s, and L_s on the basis of any one of the first-to-fourth detection data C_s, IC_s, R_s, and L_s included in the conversion data C_data to provide the synchronized data to the data transmitting/receiving unit 31 as the sensing data S_data.

In more detail, the output synchronization unit 32 may store each of the first-to-fourth detection data C_s, IC_s, R_s, and L_s included in the conversion data C_data, and may output the stored first-to-fourth detection data C_s, IC_s, R_s, and L_s as the sensing data S_data when a preset time has passed after input of any one of the first-to-fourth detection data C_s, IC_s, R_s, and L_s.

The data reliability determination unit 33 may generate the reliability data R_data on the basis of the conversion data C_data and the external environment data EC_data provided from the data transmitting/receiving unit 31, and may provide the generated reliability data R_data to the data transmitting/receiving unit 31.

Here, the conversion data C_data includes the first-to-fourth detection data C_s, IC_s, R_s, and L_s obtained from the optical camera 11, the infrared camera 12, the radar 13, and the lidar 14, and the data reliability determination unit 33 generates the reliability data R_data on the basis of each of the first to fourth detection data C_s, IC_s, R_s, and L_s and the is external environment data EC_data, and thus, the reliability data R_data may include the reliability of each of the first-to-fourth detection data C_s, IC_s, R_s, and L_s output from each sensor.

For example, in cases when dirt or other foreign matter may easily adhere to the outer cover of the automotive sensor integration module 100 on the basis of the external environment data EC_data including weather, temperature, humidity, and road conditions, the data reliability determination unit 33 may generate the reliability data R_data indicating low reliability for each of the first-to-fourth detection data C_s, IC_s, R_s, and L_s.

Furthermore, in cases when dirt or other foreign matter may not easily adhere to the outer cover of the automotive sensor integration module 100 on the basis of the external environment data EC_data, the data reliability determination unit 33 may generate the reliability data R_data indicating high reliability for each of the first-to-fourth detection data C_s, IC_s, R_s, and L_s.

Here, dirt or other foreign matter may more easily adhere to the outer cover of the automotive sensor integration module 100 in a situation in which it rains or snows; the temperature is low enough to produce frost; or the humidity is high, than in a situation in which it does not rain or snow; the temperature is high enough such that frost is not generated; or the humidity is low.

Figure 7:
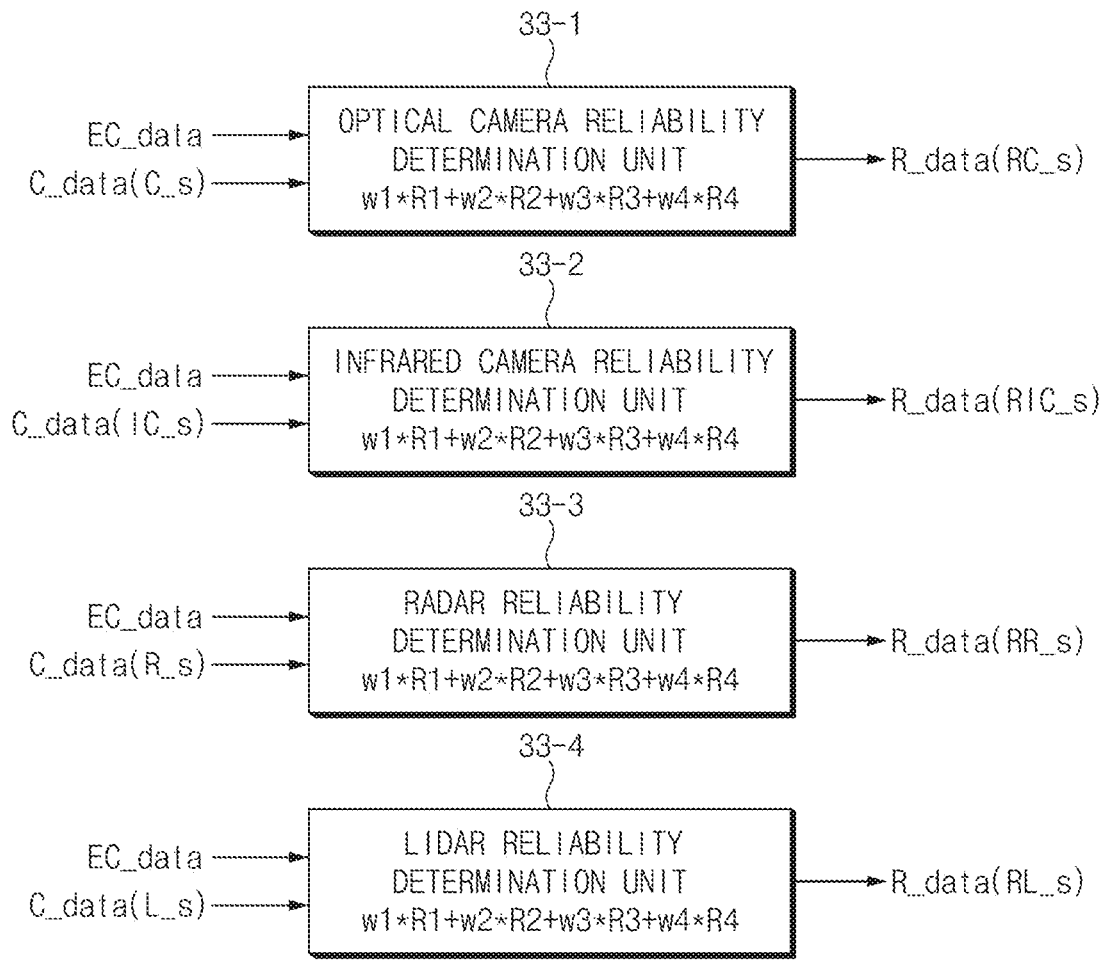
FIG. 7 is a diagram illustrating a configuration of the data reliability determination unit of FIG. 6.

FIG. 7 is a diagram illustrating a configuration of the data reliability determination unit of FIG. 6.

As illustrated in FIG. 7, the data reliability determination unit 33 may include an optical camera reliability determination unit 33-1, an infrared camera reliability determination unit 33-2, a radar reliability determination unit 33-3, and a lidar reliability determination unit 33-4.

As described above, the data reliability determination unit 33 may determine, on the basis of the external environment data EC_data, the reliability of each of the first-to-fourth detection data C_s, IC_s, R_s, and L_s included in the conversion data C_data, and may output a determination data as the reliability data R_data.

The optical camera reliability determination unit 33-1 may generate an optical camera reliability value RC_s on the basis of the first detection data C_s and the external environment data EC_data, and may output the generated optical camera reliability value RC_s as the reliability data R_data.

For example, the optical camera reliability determination unit 33-1 may increase the optical camera reliability value RC_s as the number of occurrences of data which enables color discrimination from the first detection data C_s output from the optical camera 11 increases during a preset time. When a data value difference occurs between the previous first detection data C_s and the current first detection data C_s, the optical camera reliability determination unit 33-1 may increase the optical camera reliability value RC_s. On the basis of the external environment data EC_data, the optical camera reliability determination unit 33-1 may further decrease the optical camera reliability value RC_s when it rains or snows than when it does not rain or snow, and may further decrease the optical camera reliability value RC_s when a vehicle travels on an unpaved road than when a vehicle travels on a paved road.

In more detail, the optical camera reliability determination unit 33-1 may calculate the optical camera reliability value RC_s using the formula $w1*R1+w2*R2+w3*R3+w4*R4$. Here, w1, w2, w3, and w4 may be weight values, and R1 may be a value which is increases or decreases according to the number of occurrences of data which enables color discrimination from the first detection data C_s output from the optical camera 11 during a preset time. R2 may be a value which increases or decreases according to the data value difference between the previous first detection data C_s and the current first detection data C_s. R3 may be a value which increases or decreases according to rainy or snowy weather, temperature, or humidity from the external environment data EC_data. R4 may be a value which increases or decreases according to a condition of a road on which a vehicle travels from the external environment data EC_data.

The infrared camera reliability determination unit 33-2 may generate an infrared camera reliability value RIC_s on the basis of the second detection data IC_s and the external environment data EC_data, and may output the generated infrared camera reliability value RIC_s as the reliability data R_data.

For example, the infrared camera reliability determination unit 33-2 may increase the infrared camera reliability value RIC_s as the number of occurrences of data which enables color discrimination from the second detection data IC_s output from the infrared camera 12 increases during a preset time. When there occurs a data value difference between the previous second detection data IC_s and the current second detection data IC_s, the infrared camera reliability determination unit 33-2 may increase the infrared camera reliability value RIC_s.

On the basis of the external environment data EC_data, the infrared camera reliability determination unit 33-2 may further decrease the infrared camera reliability value RIC_s when it rains or snows than when it does not rain or snow, and may further decrease the infrared camera reliability value RIC_s when a vehicle travels on an unpaved road than when a vehicle travels on a paved road.

In more detail, the infrared camera reliability determination unit 33-2 may calculate the infrared camera reliability value RIC_s using the formula w1*R1+w2*R2+w3*R3+w4*R4. Here, w1, w2, w3, and w4 may be weight values, and R1 may be a value which increases or decreases according to the number of occurrences of data which enables color discrimination from the second detection data IC_s output from the infrared camera 12 during a preset time. R2 may be a value which increases or decreases according to the data value difference between the previous second detection data IC_s and the current second detection data IC_s. R3 may be a value which increases or decreases according to rainy or snowy weather, temperature, or humidity from the external environment data EC_data. R4 may be a value which increases or decreases according to a condition of a road on which a vehicle travels from the external environment data EC_data.

The radar reliability determination unit 33-3 may generate a radar reliability value RR_s on the basis of the third detection data R_s and the external environment data EC_data, and may output the generated radar reliability value RR_s as the reliability data R_data.

For example, the radar reliability determination unit 33-3 may increase the radar reliability value RR_s as the number of occurrences of data which enables distance determination from the third detection data R_s output from the radar 13 increases during a preset time. When there occurs a data value difference between the previous third detection data R_s and the current third detection data R_s, the radar reliability determination unit 33-3 may increase the radar reliability value RR_s.

On the basis of the external environment data EC_data, the radar reliability determination unit 33-3 may further decrease the radar reliability value RR_s when it rains or snows than when it does not rain or snow, and may further decrease the radar reliability value RR_s when a vehicle travels on an unpaved road than when a vehicle travels on a paved road.

In more detail, the radar reliability determination unit 33-3 may calculate the radar reliability value RR_s using the formula w1*R1+w2*R2+w3*R3+w4*R4. Here, w1, w2, w3, and w4 may be weight values, and R1 may be a value which increases or decreases according to the number of occurrences of data which enables distance determination from the third detection data R_s output from the radar 13 during a preset time. R2 may be a value which increases or decreases according to the data value difference between the previous third detection data R_s and the current third detection data R_s. R3 may be a value which increases or decreases according to rainy or snowy weather, temperature, or humidity from the external environment data EC_data. R4 may be a value which increases or decreases according to a condition of a road on which a vehicle travels from the external environment data EC_data.

The lidar reliability determination unit 33-4 may generate a lidar reliability value RL_s on the basis of the fourth detection data L_s and the external environment data EC_data, and may output the generated lidar reliability value RL_s as the reliability data R_data.

For example, the lidar reliability determination unit 33-4 may increase the lidar reliability value RL_s as the number of occurrences of data which enables distance determination from the fourth detection data L_s output from the lidar 14 increases during a preset time. When there occurs a data value difference between the previous fourth detection data L_s and the current fourth detection data L_s, the lidar reliability determination unit 33-4 may increase the lidar reliability value RL_s.

On the basis of the external environment data EC_data, the lidar reliability determination unit 33-4 may further decrease the lidar reliability value RL_s when it rains or snows than when it does not rain or snow, and may further decrease the lidar reliability value RL_s when a vehicle travels on an unpaved road than when a vehicle travels on a paved road.

In more detail, the lidar reliability determination unit 33-4 may calculate the lidar reliability value RL_s using the formula w1*R1+w2*R2+w3*R3+w4*R4. Here, w1, w2, w3, and w4 may be weight values, and R1 may be a value which increases or decreases according to the number of occurrences of data which enables distance determination from the fourth detection data L_s output from the lidar 14 during a preset time. R2 may be a value which increases or decreases according to the data value difference between the previous fourth detection data L_s and the current fourth detection data L_s. R3 may be a value which increases or decreases according to rainy or snowy weather, temperature, or humidity from the external environment data EC_data. R4 may be a value which increases or decreases according to a condition of a road on which a vehicle travels from the external environment data EC_data.

As described above, the automotive sensor integration module 100 according to the present invention may detect the reliability of each of the detection data C_s, IC_s, R_s, and L_s respectively output from the optical camera 11, the infrared camera 12, the radar 13, and the lidar 14 and may provide the reliability to the upper-level control device 200 for identifying an object, and thus the object identification performance of an automated driving system or ADAS system in which the automotive sensor integration module 100 according to the present invention is applied may be improved.

Furthermore, the automotive sensor integration module 100 according to the present invention may detect the reliability of each of the detection data C_s, IC_s, R_s, and L_s respectively output from the optical camera 11, the infrared camera 12, the radar 13, and the lidar 14 and may provide the reliability to the cleaning control device 300 so that the reliability may be used in cleaning the outer cover of the automotive sensor integration module 100, and thus the reliability of detection data of sensors may be improved. Therefore, the object determination performance of an automated driving system or ADAS system in which the automotive sensor integration module 100 according to the present invention is applied may be improved.

The automotive sensor integration module according to an exemplary embodiment of the present invention has improved performance of detecting objects outside a vehicle since a plurality of sensors are synchronously operated.

Furthermore, the automotive sensor integration module according to an exemplary embodiment of the present invention has improved performance of detecting objects outside a vehicle since the reliability of detection data of each of a plurality of sensors is determined.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An automotive sensor integration module comprising:
a plurality of sensors differing from each other in at least one of a sensing period or an output data format; and
a signal processor configured to:
simultaneously output, as sensing data, pieces of detection data respectively output from the plurality of sensors on the basis of the sensing period of any one of the plurality of sensors;
calculate a reliability value of each of the pieces of detection data on the basis of the pieces of detection data and external environment data; and
output the reliability value as reliability data.

2. The automotive sensor integration module of claim 1, wherein the signal processor receives and stores the pieces of detection data, and simultaneously outputs the stored pieces of detection data on the basis of the sensing period of any one of the plurality of sensors.

3. The automotive sensor integration module of claim 1, wherein the signal processor increases or decreases the reliability values of the pieces of detection data according to the number of occurrences of data which enables at least one of color discrimination or distance determination from the pieces of detection data.

4. The automotive sensor integration module of claim 3, wherein the signal processor increases the reliability values of the pieces of detection data as the number of occurrences of data which enables at least one of color discrimination or distance determination from the pieces of detection data increases.

5. The automotive sensor integration module of claim 1, wherein the signal processor increases or decreases the reliability values of the pieces of detection data according to whether a data value difference occurs between current data and previous data of the pieces of detection data.

6. The automotive sensor integration module of claim 5, wherein the signal processor increases the reliability values of the pieces of detection data when the data value difference occurs between the current data and the previous data of the pieces of detection data.

7. The automotive sensor integration module of claim 1, wherein the signal processor increases or decreases the reliability values of the pieces of detection data according to whether it rains or snows or a road is paved on the basis of the external environment data.

8. The automotive sensor integration module of claim 7, wherein the signal processor decreases the reliability values of the pieces of detection data to a greater degree when it rains or snows than when it does not rain or snow.

9. The automotive sensor integration module of claim 8, wherein the signal processor decreases the reliability values of the pieces of detection data to a greater degree when a vehicle travels on an unpaved road than when the vehicle travels on a paved road.

10. The automotive sensor integration module of claim 1, wherein the signal processor increases or decreases the reliability values of the pieces of detection data on the basis of at least one of:
the number of occurrences of data which enables at least one of color discrimination or distance determination from the pieces of detection data; and
whether there occurs a data value difference between current data and previous data of the pieces of detection data, weather, or a road pavement state.

11. An automotive sensor integration module comprising:
a plurality of sensors differing from each other in at least one of a sensing period or an output data format;
an output synchronization unit configured to simultaneously output, as sensing data, pieces of detection data respectively output from the plurality of sensors on the basis of the sensing period of any one of the plurality of sensors; and
a data reliability determination unit configured to calculate a reliability value of each of the pieces of detection data on the basis of the pieces of detection data and external environment data, and output the reliability value as reliability data.

12. The automotive sensor integration module of claim 11, further comprising a data transmitting/receiving unit configured to:
transfer the pieces of detection data output from the plurality of sensors to the output synchronization unit and the data reliability determination unit;
transfer the sensing data output from the output synchronization unit to an upper-level control device;
transfer the reliability data output from the data reliability determination unit to the upper-level control device and a cleaning control device; and
transfer the external environment data provided from the upper-level control device or an external device to the data reliability determination unit.

13. The automotive sensor integration module of claim 11, wherein the output synchronization unit receives and stores the pieces of detection data, and simultaneously outputs the stored pieces of detection data on the basis of the sensing period of any one of the plurality of sensors.

14. The automotive sensor integration module of claim 11, wherein the plurality of sensors comprise at least one of an optical camera, an infrared camera, a radar, or a lidar.

15. The automotive sensor integration module of claim 14, wherein the data reliability determination unit comprises at least one of:
an optical camera reliability determination unit configured to calculate an optical camera reliability value on the basis of first detection data output from the optical camera and the external environment data;
an infrared camera reliability determination unit configured to calculate an infrared camera reliability value on the basis of second detection data output from the infrared camera and the external environment data;
a radar reliability determination unit configured to calculate a radar reliability value on the basis of third detection data output from the radar and the external environment data; and
a lidar reliability determination unit configured to calculate a lidar reliability value on the basis of fourth detection data output from the lidar and the external environment data.

16. The automotive sensor integration module of claim 15, wherein:
the optical camera reliability determination unit calculates the optical camera reliability value according to at least one of:
the number of occurrences of data which enables color discrimination from the first detection data; and
whether there occurs a data value difference between previous data and current data of the first detection data, weather, and a road pavement state; and
the optical camera reliability determination unit outputs a calculated value as the reliability data.

17. The automotive sensor integration module of claim 15, wherein:

the infrared camera reliability determination unit calculates the infrared camera reliability value according to at least one of:

the number of occurrences of data which enables color discrimination from the second detection data; and whether there occurs a data value difference between previous data and current data of the second detection data, weather, and a road pavement state; and the infrared camera reliability determination unit outputs a calculated value as the reliability data.

18. The automotive sensor integration module of claim 15, wherein:

the radar reliability determination unit calculates the radar reliability value according to at least one of:

the number of occurrences of data which enables distance determination from the third detection data; and whether there occurs a data value difference between previous data and current data of the third detection data, weather, and a road pavement state; and the radar reliability determination unit outputs a calculated value as the reliability data.

19. The automotive sensor integration module of claim 15, wherein:

the lidar reliability determination unit calculates the lidar reliability value according to at least one of:

the number of occurrences of data which enables distance determination from the fourth detection data; and whether there occurs a data value difference between previous data and current data of the fourth detection data, weather, and a road pavement state; and the lidar reliability determination unit outputs a calculated value as the reliability data.

* * * * *